US006794587B2

(12) United States Patent
Aumard et al.

(10) Patent No.: US 6,794,587 B2
(45) Date of Patent: Sep. 21, 2004

(54) MEASURING SENSOR WITH A HERMETICALLY SEALED CAVITY WHICH IS FORMED BY THE MEASURING BEAM AND TWO MEMBRANES SITUATED ON EACH SIDE OF THE BEAM

(75) Inventors: Jean-Pierre Aumard, Etrembieres (FR); Jean-Claude Navarro, Ville-la-Grand (FR)

(73) Assignee: S.C.A.I.M.E. S.A., Annemasse (FR)

( * ) Notice: Subject to any disclaimer, the term of this patent is extended or adjusted under 35 U.S.C. 154(b) by 151 days.

(21) Appl. No.: 10/273,979

(22) Filed: Oct. 21, 2002

(65) Prior Publication Data
US 2003/0111277 A1 Jun. 19, 2003

(30) Foreign Application Priority Data
Dec. 15, 2001 (EP) .............................................. 01129900

(51) Int. Cl.[7] .............................. G01G 3/14; G01L 1/22
(52) U.S. Cl. .................. 177/211; 177/229; 73/862.632; 73/862.634
(58) Field of Search ................................ 177/211, 229; 73/862.632, 862.633, 862.634, 862.637, 862.638, 862.639

(56) References Cited

U.S. PATENT DOCUMENTS

| 4,107,985 | A | | 8/1978 | Sommer ................. 73/862.633 |
|---|---|---|---|---|
| 4,150,729 | A | | 4/1979 | Ormond ....................... 177/211 |
| 4,196,784 | A | * | 4/1980 | Suzuki et al. ................. 177/211 |
| 4,343,197 | A | * | 8/1982 | Suzuki et al. ........... 73/862.633 |
| 4,546,838 | A | | 10/1985 | Ormond ....................... 177/211 |
| 4,549,439 | A | * | 10/1985 | Keen et al. ............. 73/862.627 |
| 4,557,150 | A | * | 12/1985 | Utsunomiya ........... 73/862.627 |
| 4,674,342 | A | * | 6/1987 | Ushijima et al. ....... 73/862.632 |
| 4,957,177 | A | * | 9/1990 | Hamilton et al. ........... 177/211 |
| 5,052,505 | A | * | 10/1991 | Naito et al. ................. 177/229 |
| 5,220,971 | A | * | 6/1993 | Farr ............................ 177/229 |
| 5,293,007 | A | * | 3/1994 | Darst et al. ................. 177/229 |
| 2004/0060372 | A1 | * | 4/2004 | Hopkins |

FOREIGN PATENT DOCUMENTS

DE          34 38 498 A1    6/1985
EP            399466 A2  * 11/1990  .................. 177/229

* cited by examiner

Primary Examiner—Randy W. Gibson
(74) Attorney, Agent, or Firm—Young & Thompson

(57) ABSTRACT

The hermetically sealed measuring sensor includes a monolithic proof body having at its ends a first and a second non-deformable parts connected together by a central part designed as a deformable parallelogram. This central part has two through openings defining between them a main beam of which at least one end is joined via a connecting section to a measuring beam which performs one piece with a non-deformable part of the proof body, but is uncoupled mechanically there from. At least one of the non-deformable parts has at least one cavity of which one wall is formed by the measuring beam and by two membranes situated one on each side of this measuring beam. Strain gauges are fixed inside the cavity on the back of the measuring beam and the cavity is closed by a cover which is welded, bonded, or fixed tightly to the corresponding non-deformable part.

12 Claims, 4 Drawing Sheets

MEASURING SENSOR WITH A HERMETICALLY SEALED CAVITY WHICH IS FORMED BY THE MEASURING BEAM AND TWO MEMBRANES SITUATED ON EACH SIDE OF THE BEAM

The object of the present invention is a measuring sensor of the type including a monolithic proof body provided with strain gauges attached to this proof body in at least one of its zones where an elastic deformation occurs as a result of a strain being applied to said proof body.

Generally, the proof body is comprised of a monolithic deformable rod which can be construed as a deformable parallelogram of which one end is fixed to a rigid frame and of which the other end is designed in such a manner as to receive the load to be measured.

The present invention is aimed at providing such a sensor, which could furthermore be used in a challenging or a corrosive environment, in salt water, in chlorinated water or in acid water, etc., where such strain gauges have to be protected to prevent their degradation.

Generally, strain gauges are protected by a coating or a film made of a material which is resistant to corrosive agents. Experience has however shown that it is always this protection which deteriorates in the first place, necessitating that the sensor be replaced, although its mechanical part (i.e. the proof body) is still sound.

Sensors have been proposed, in which the strain gauges are enclosed in sealed cavities, as is described, for example, in documents U.S. Pat. No. 4,488,611 or U.S. Pat. No. 5,220,971. These designs necessitate however the welding of metal covers or protective members on the proof body in the immediate vicinity of the deformation zones thereof, in order to encapsulate hermetically said strain gauges. This operation provides a durable protection for the strain gauges, but affects adversely the accuracy and the reliability of the measurements. In fact, the welding of these covers or protections in the immediate vicinity of the deformation zones of the proof body induces structural modifications in the material constituent of the proof body in these zones, thereby modifying, in particular, its elasticity characteristics, which leads to inaccuracies or measurement errors, which cannot be readily corrected electrically.

The present invention is aimed at providing a sensor which includes a monolithic proof body with strain gauges which are encapsulated, and hence protected from the environment, and which obviates the above-mentioned drawbacks, namely which is durable and in which the protection of the gauges does not influence the measuring characteristics.

The object of the present invention is a measuring sensor including a monolithic proof body which is provided with strain gauges and which has the characteristic features set out in claim 1.

The appended drawing illustrates schematically and by way of example four embodiments of the sensor according to the invention.

Figure 1:
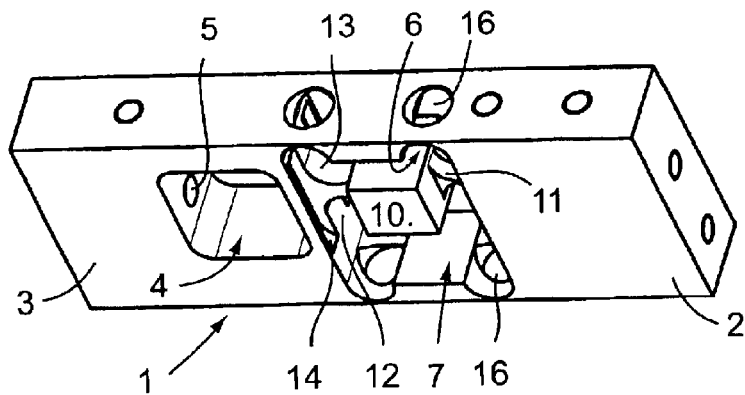
FIG. 1 is a perspective view of a first embodiment of the sensor.
Figure 2:
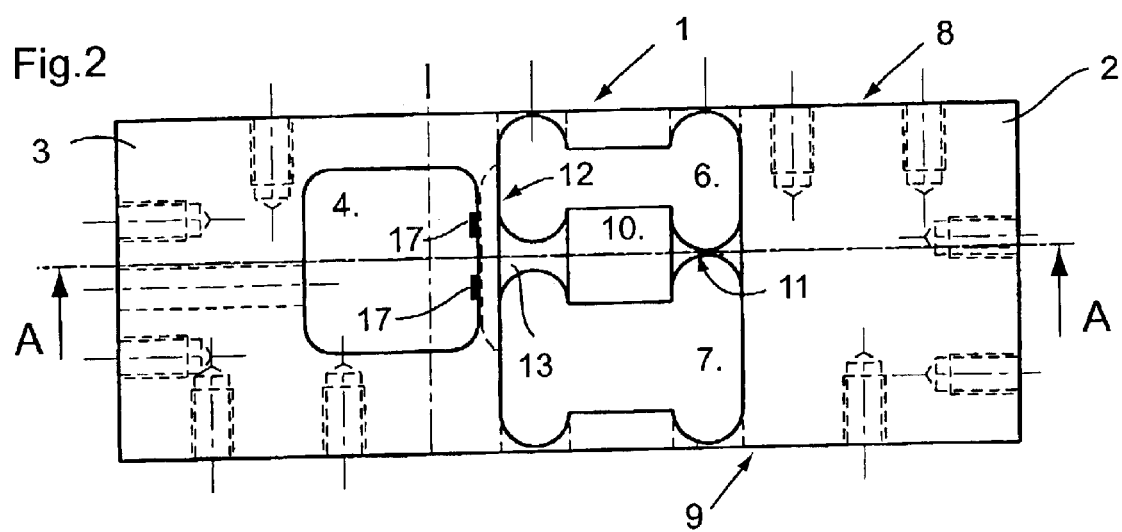
FIG. 2 is an elevation view of the sensor of FIG. 1.
Figure 3:
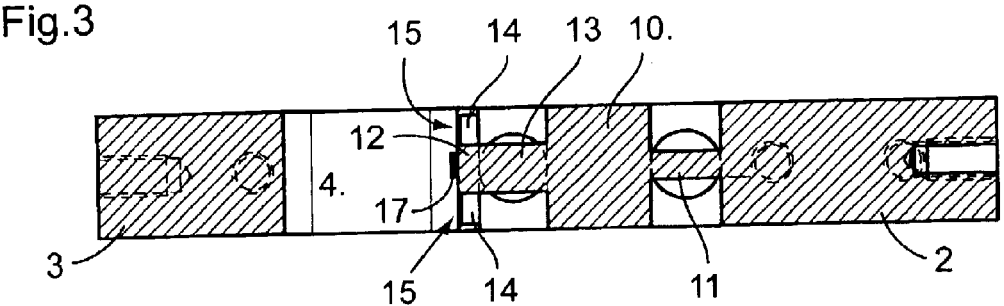
FIG. 3 is a cross-sectional view, taken along line A—A, of FIG. 2.

The measuring sensor according to the present invention includes a monolithic proof body designed as a deformable parallelogram and is made of steel, of stainless steel or of an alloy thereof, of aluminum or of any other elastic material. One end of the proof body is designed for being attached to a frame, whereas the other one is designed for receiving a load or a force to be measured. This proof body is traversed transversally by two hollows defining, on the one hand, zones of reduced thickness acting as the hinges of the deformable parallelogram and, on the other hand, a main beam. This main beam is connected by its ends, on the one hand, directly to a first non-deformable part of the proof body and, on the other hand, via a measuring beam, to a second non-deformable part of the proof body.

This measuring beam is connected laterally to this second non-deformable part of the proof body by thin membranes in such a manner as to enable this measuring beam to deform without transmitting the deformation to the second non-deformable part of the proof body.

Furthermore, the proof body additionally includes a cavity in its second non-deformable part, of which one wall is formed at least in part, by said membranes and by the measuring beam. This cavity is designed for receiving the strain gauges and at least one part of the electrical measuring circuit, it communicates with the outside of the proof body by a passage for wires and it can be sealed hermetically by welding, bonding or by fixing tightly covers, which operation is carried out on the non-deformable part of the proof body and does not to affect in any manner whatsoever the characteristics of elasticity of the measuring beams.

In a first embodiment, the measuring sensor includes a monolithic proof body 1 made from, for example, stainless steel and having a first non-deformable part 2 at one of its ends and a second non-deformable part 3 at its other end.

The first non-deformable part 2 of the proof body 1 includes fastening members, here threaded bores, which make it possible to couple said part with a member receiving a load or transmitting a strain to be measured, whereas the second non-deformable part 3 of the proof body includes threaded bores which make it possible to fasten said part to a fixed frame. This second deformable part 3 of the proof body 1 exhibits a cavity 4 which opens on at least one lateral side of the proof body and which communicates with a narrow side of the proof body through a cable passage 5.

The central part of the proof body 1, which is capable of deforming elastically, has two through openings 6, 7 defining with the upper and lower narrow sides of the proof body 1, respectively 8 and 9, hinges or flexible thin sections enabling the proof body to deform in the manner of a deformable parallelogram.

These openings 6 and 7 define between them a main beam 10 joined via a thin connecting section 11 to a first non-deformable part 2 of the proof body 1 and forming one piece with a measuring beam 12 through a connecting section 13. The measuring beam 12 is located between two recesses 14 which are milled out in such a manner that this measuring beam 12 be connected laterally through two thin membranes 15 to the second non-deformable part 3 of the proof body 1, to enable this measuring beam 12 to deform elastically without this deformation being transmitted to this second non-deformable part 3.

The thin membranes 15 (0.1 to 1.5 mm and preferably 0.1 to 0.7 mm) separate the openings 6, 7 from the cavity 4 and uncouple the measuring beam 12 from the second non-deformable part 3 of the proof body 1.

In the example illustrated, passages 16 are provided for reducing the rigidity of the thin sections forming the hinges of the deformable parallelogram, which the proof body 1 constitutes.

Strain gauges 17 are fixed on the longitudinal face of the measuring beam 12, they are located within the cavity 4, between the membranes 15 and they are connected to an electrical measuring circuit located either outside of the proof body 1, or at least partly in the cavity 4 of the proof body. These strain gauges 17 and/or the part of the electrical circuit located in the cavity 4 are connected by a cable (not illustrated) extending through the passage 5 which is sealed, to enable a connection with the measuring equipment outside of the proof body 1.

The cavity 4 of the proof body 1 then receives two covers (not illustrated) applied on the lateral faces of the proof body 1 in such a manner as to close sealingly the openings of the cavity 4. These covers are welded, bonded or fixed tightly to the non-deformable part 3 of the proof body 1.

In such an embodiment, the welding, the bonding or the fixing operations carried out around the openings of the cavity 4 for retaining the covers sealing this cavity 4 do not affect, in any way, the beams 10 and 12 of the proof body, of which the deformation is measured. Accordingly, these operations do not affect in any way neither the accuracy, nor the reliability of the measurements.

A sensor is thus provided, which carries a monolithic proof body of which the strain gauges and, optionally, the totality or a part of the electrical measuring circuit, are encapsulated in a cavity of the proof body 1, which cavity is sealed hermetically. The encapsulation of the strain gauges in the proof body is achieved by welding, bonding, or fixing tightly covers on a part of the proof body which does not partake in the deformation used for the measurements. One thus obtains a sealed sensor, which is reliable, inalterable and accurate.

Figure 4:
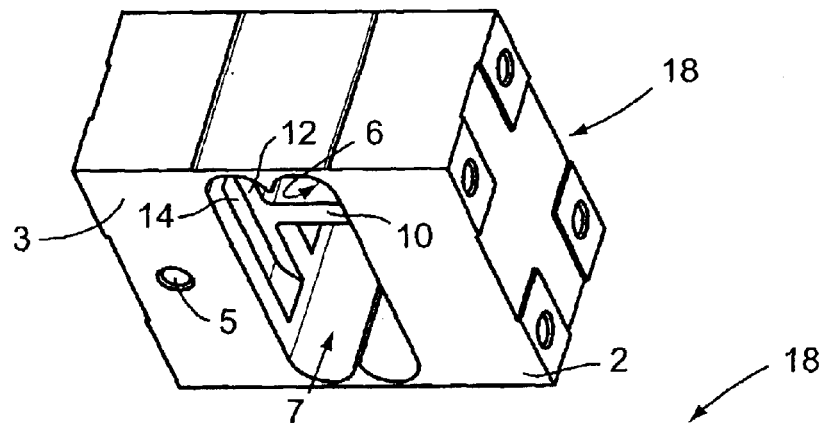
FIG. 4 is a perspective view of a second embodiment of the sensor.
Figure 5:
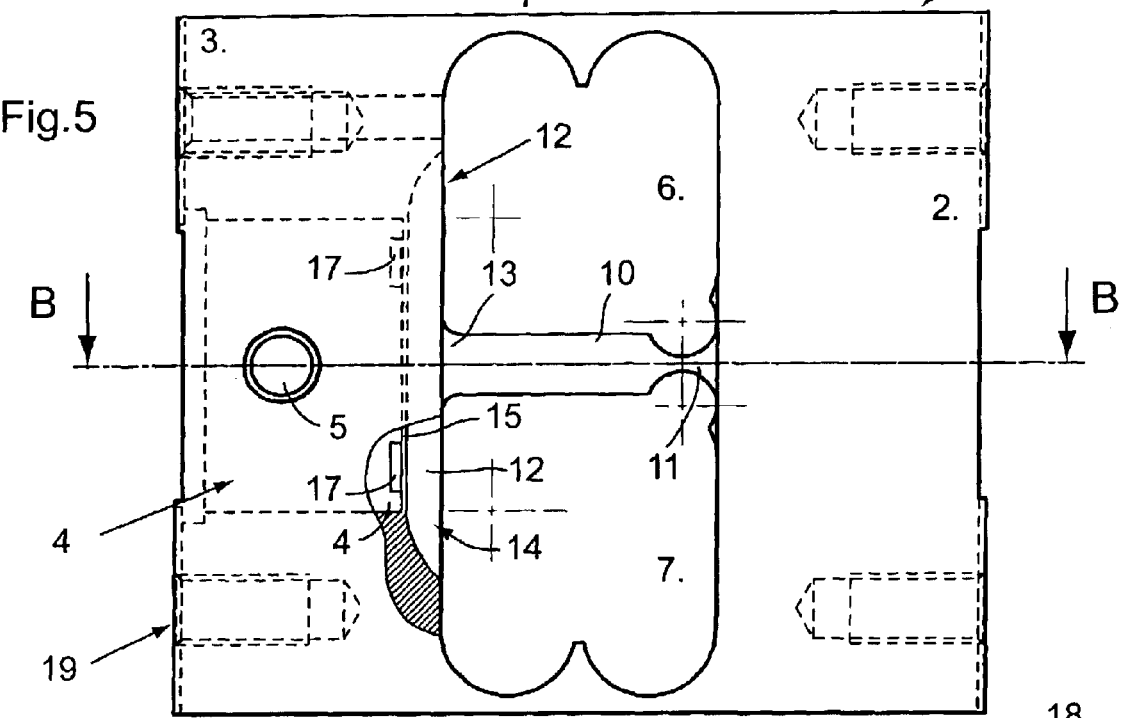
FIG. 5 is an elevation view of the sensor illustrated in FIG. 4.
Figure 6:
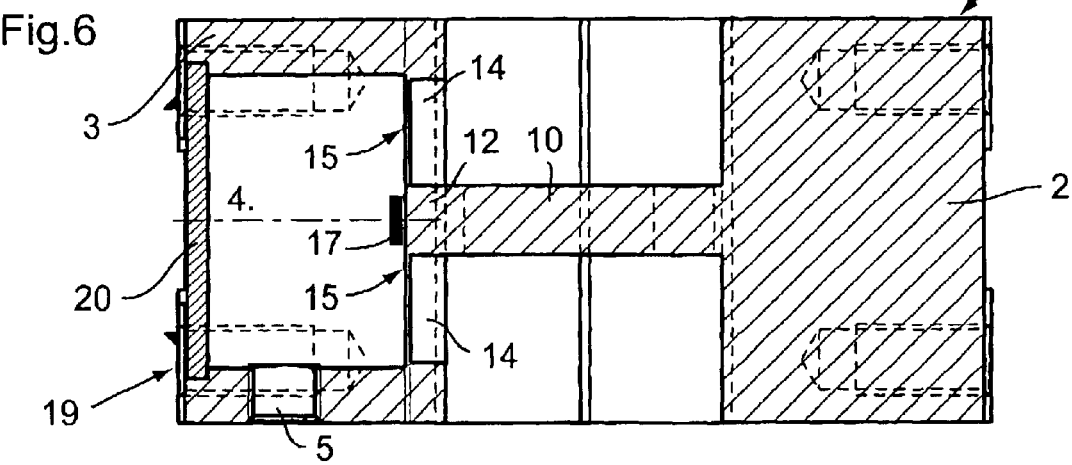
FIG. 6 is a cross-sectional view, taken along line B—B, of FIG. 5.
Figure 7:
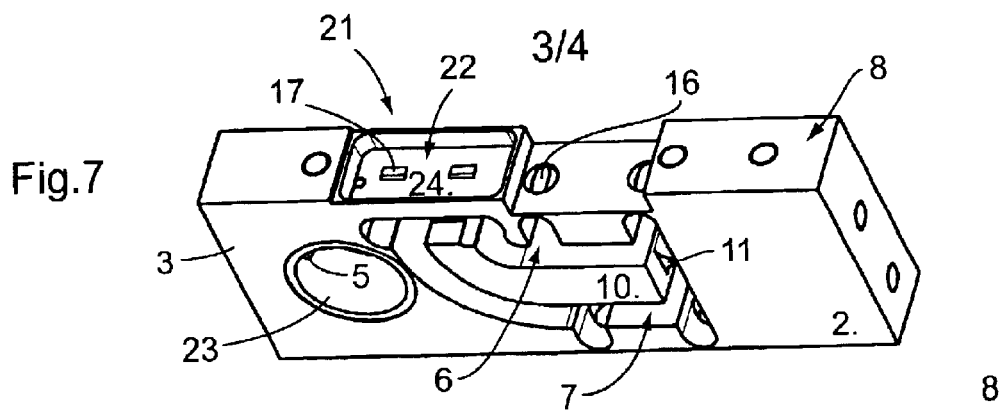
FIG. 7 is a perspective view of a third embodiment of the sensor.
Figure 8:
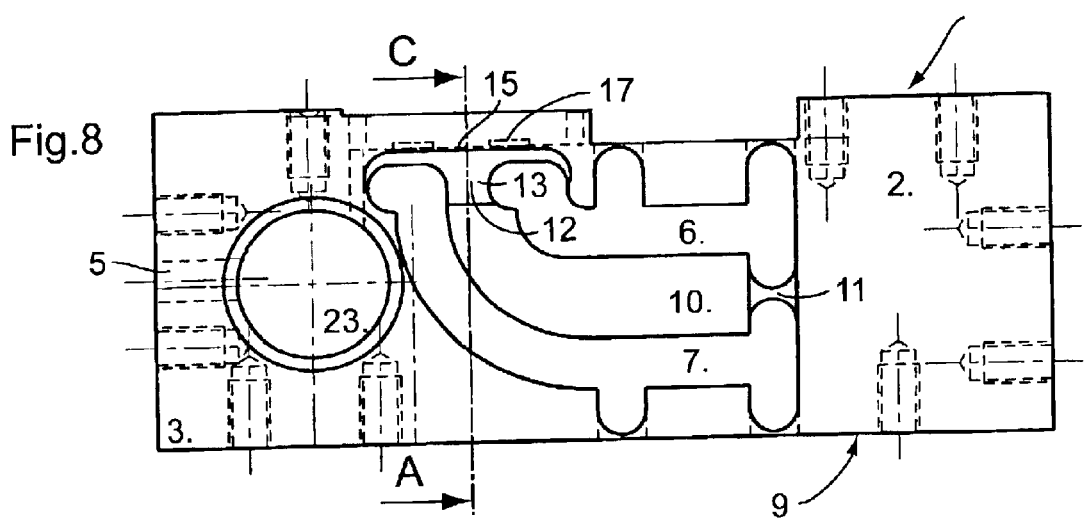
FIG. 8 is an elevation view of the sensor illustrated in FIG. 7.
Figure 9:
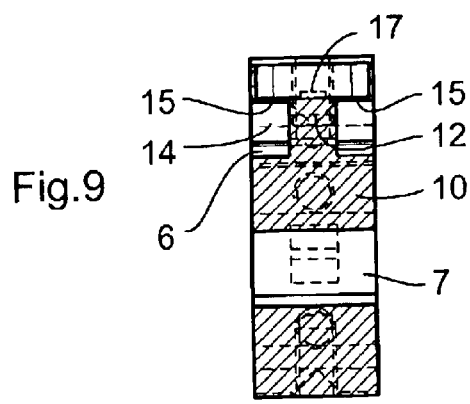
FIG. 9 is a cross-sectional view, taken along line C—C, of FIG. 8.
Figure 10:
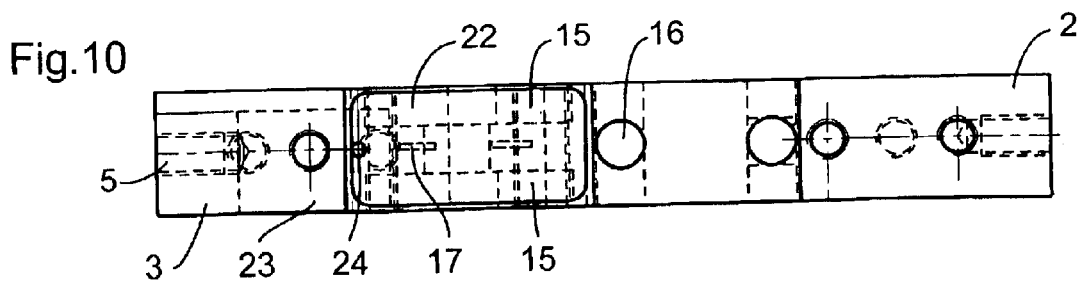
FIG. 10 is a view of the upper face of the sensor.

In the embodiment illustrated in FIGS. 4 to 6, the proof body 1 has the shape of a monolithic rod 18 including, as in the first embodiment, two non-deformable end parts 2, 3 and a central part having the openings 6, 7, with the main beam 10 and the thin sections providing the hinge section. Here again, the sensor is a deformable parallelogram with a main central beam.

The main beam 10 is joined, via a connecting section 11, to the non-deformable part 2 of the proof body, while its other end is joined to the measuring beam 12 which forms one piece with the non-deformable part 3 of the proof body 18. This measuring beam 12 is mechanically uncoupled from the non-deformable part 3 by the lateral milled-out recesses 14, as in the first embodiment.

In this second embodiment, the cavity 4 opens on the front narrow side 19 of the non-deformable part 3 of the proof body 18 and it has a passage 5 for the cable, opening on a lateral face of the proof body 18.

Once the strain gauges 17 are positioned and connected, the cavity 4 is closed hermetically by welding, bonding or fixing tightly a closure plate 20 on the front face 19 of the non-deformable part 3 of the proof body 18.

The same advantages are provided here as those of the sensor according to the first embodiment, namely a complete, an efficient and a permanent tightness for the chamber housing the strain gauges 17 and the totality or a part of the electrical circuit, while avoiding any alteration in the characteristics of the material of the proof body in the vicinity of its deformable parts used for the measurements.

This second embodiment makes it possible to access to the cavity 4 from one end of the proof body whereas in the first embodiment, the access to this cavity is possible from one or the two lateral faces of the proof body.

In the third embodiment illustrated in FIGS. 7 to 10, the proof body 1 is shaped as a monolithic rectangular plate also with two non-deformable zones 2, 3 and it is also designed as a parallelogram which is deformable, owing to the openings 6, 7 made in its central part. In this embodiment, the main beam 10 is curved and it is joined via a connecting section 11 at one end to the non-deformable part 2, while being joined at its other end to the measuring beam 12 which forms one piece with the non-deformable part 3 of the proof body, but is uncoupled therefrom by lateral membranes 15 forming, with the upper face of the measuring beam 12, the bottom of a first cavity 22 opening on the upper narrow side 8 of the proof body. A second cavity 23 provided in the non-deformable part 3 of the proof body, opens on the lateral front face of this proof body. A passage 24 extends from the first cavity 22 to the second cavity 23, while a cable passage 5 extends from the second cavity 23 to the end narrow side of the non-deformable part 3 of the proof body.

In this embodiment, covers (not illustrated) are placed on the openings of the cavities 22 and 23 and they are welded, bonded or fixed tightly to the non-deformable part 3 of the proof body.

As the first cavity 22 has here a small volume, it houses only the strain gauges 17 and the electrical measuring circuit is housed in the second cavity 23.

Figure 11:
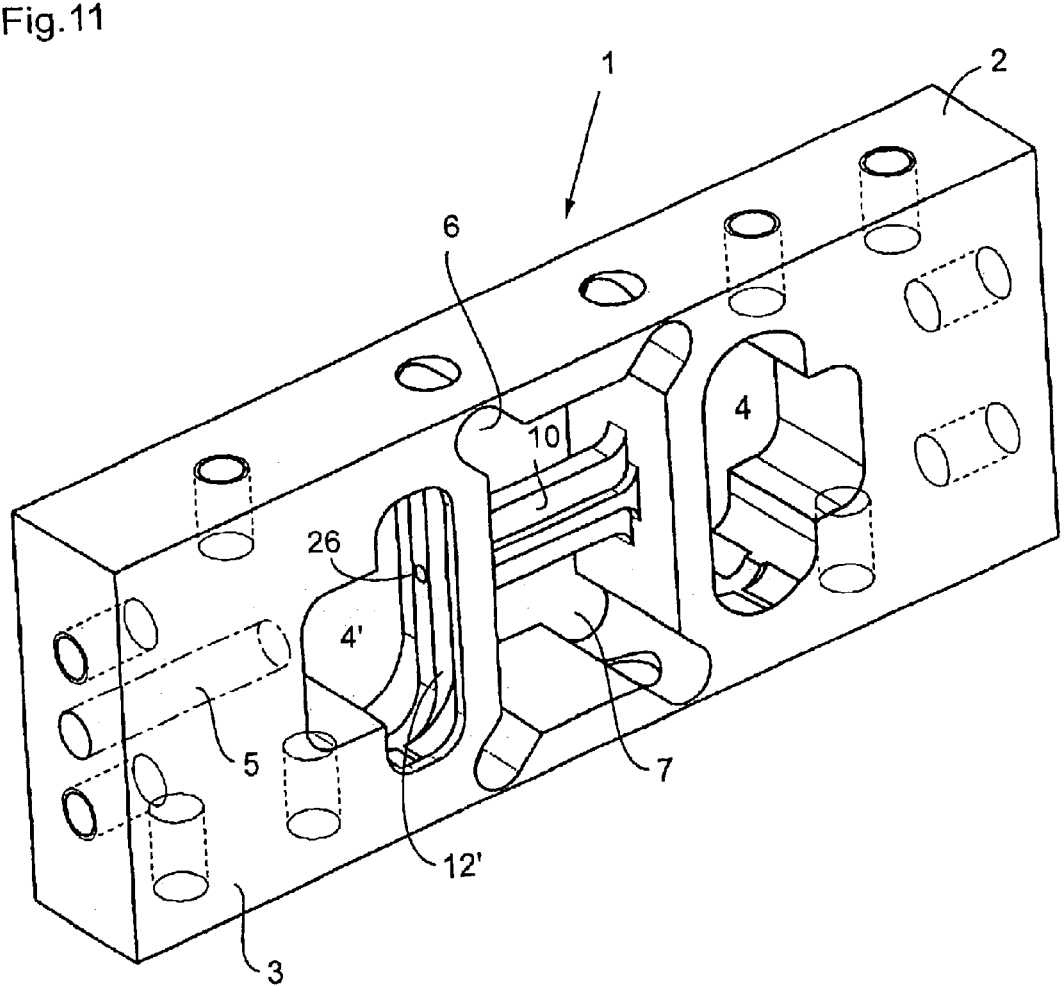
FIG. 11 is a side elevation view of a fourth embodiment of the sensor according to the invention.

In the fourth embodiment illustrated in FIG. 11, the proof body 1 assumes the shape of a monolithic rod of a rectangular or of a square cross-section, it also has two non-deformable zones 2, 3 and is designed as a parallelogram which is deformable owing to the openings 6, 7 provided in its central part. In this embodiment, the main beam 10 is of a cross-section having the shape of a cross and is joined at each of its ends to a respective measuring beam 12, 12', each forming one piece with a respective non-deformable part 2, 3. These measuring beams 12, 12' are uncoupled from the respective non-deformable parts 2, 3 by membranes 15, 15' forming with the back face of the measuring beams 12, 12', the bottom of two cavities 4, 4' opening on at least one of the lateral faces of the proof body 1. A passage 26 extending through the web of the main beam 10 connects these two cavities 4, 4'. The cavity 4' communicates via a cable passage 5 with the end narrow side of the non-deformable part 3.

In this embodiment, covers (not illustrated) are placed on the openings of the cavities 4, 4' and they are welded, bonded of fixed tightly on the non-deformable parts 2, 3 of the proof body 1.

The cavities 4 and 4' may not open on the same lateral face of the proof body 1, but on the two faces thereof. The main beam can exhibit a cross-section of a different shape, such as square or rectangular.

Accordingly, it can be seen that in all the embodiments, the monolithic proof body has two zones or parts 2, 3 which are non-deformable and which form its ends, and a central zone or part designed as a deformable parallelogram. A main beam 10 is joined by at least one of its ends to or in the central part of a measuring beam 12 which is part of one or both of the non-deformable parts 2, 3 of the proof body 1, while being mechanically uncoupled therefrom owing to the milled-out recessed 14 and the membranes 15. These membranes 15 and the face of the measuring beam 12 which forms one piece with a non-deformable part 2, 3 of the proof body provide the wall of at least one cavity machined in one or both of the deformable parts 2, 3 of the proof body, which cavities open on a free face of this non-deformable part of the proof body. A cover or covers which are welded, bonded or fixed tightly on the non-deformable part or parts of the proof body close hermetically and permanently the cavities. One thus obtains a monolithic sensor which is impervious and devoid of fastenings means in the vicinity of the deformable parts of the proof body, with the result that these deformable parts suffer no alteration and that the reliability and the accuracy of the sensor remains optimum.

What is claimed is:

1. A hermetically sealed sensor including a monolithic proof body (1) having at its ends a first (2) and a second (3) non-deformable parts connected together by a central part designed as a deformable parallelogram, characterized in that the central part of the proof body (1) has two through openings (6, 7) defining between them a main beam (10) of which at least one end is joined via a connecting section (13) to a measuring beam (12) which forms one piece with a non-deformable part (2, 3) of the proof body, but is uncoupled mechanically from the same; in that at least one of the non-deformable parts (2, 3) of the proof body has at least one cavity (4, 4', 22) of which one wall is formed by the measuring beam (12) and by two membranes (15) situated one on each side of this measuring beam (12); in that strain gauges (17) are fixed inside the cavity (4) on the back of the measuring beam (12); and in that the cavity (4) is closed by a cover (20) which is welded, bonded, or fixed tightly to the corresponding non-deformable part (2, 3) of the proof body.

2. A sensor according to claim 1, characterized in that the end of the main beam (10) is joined rigidly to the measuring beam (12), which makes it possible to transmit a torque from the main beam (10) to the measuring beam (12).

3. A sensor according to claim 1, characterized in that the measuring beam (12) is connected laterally to tho second non-deformable part (3) of the proof body by two thin membranes (15), which makes possible a deformation of the measuring beam (12) relative to the proof body (1).

4. A sensor according to claim 1, characterized in that one of the ends of the main beam (10) is connected to the first non-deformable part (2) of the proof body (1), and in that it is flexible and does not transmit any torque.

5. A sensor according to claim 1, characterized in that the cavity (4) extends transversally through the second non-deformable part (3) of the proof body (1) and in that it communicates with the end narrow side of this non-deformable part (3) through a cable passage (5), the two faces of this cavity (4) being closed by covers which are welded, bonded or fixed tightly on the second non-deformable part (3) of the proof body.

6. A sensor according to claim 1, characterized in that the cavity (4) opens on the end narrow side of the second non-deformable part (3) of the proof body (1) and in that it communicates by a cable passage (5) with one of the lateral faces of the proof body (1), the opening of this cavity (4) being closed, by a cover which is welded, bonded of fixed tightly to the second non-deformable part (3) of the proof body.

7. A sensor according to claim 1, characterized in that in the main beam (10) is rectilinear.

8. A sensor according to claim 1, characterized in that the main beam (10) is curved and in that the cavity (4) opens on one of the upper narrow side (8) or the lower narrow side (9) of the second non-deformable part (3) of the proof body (1), this cavity being closed by a cover which is welded on this part (3) of the proof body (1).

9. A sensor according to claim 8, characterized in that a second cavity (23) is made in the second non-deformable part (3) of the proof body (1), the cavities (4) and (23) being in communication through a passage (24); this second cavity (23) being in communication with the outside of the proof body (1) by a cable passage (5) and closed by a cover which is welded, bonded or fixed tightly to this second non-deformable part (3) of the proof body.

10. A sensor according to claim 1, characterized in that it has two cavities (4, 4'), situated each one in one of the non-deformable zones (2, 3) of the proof body (1) and two measuring beams (12, 12') which are joined each one to one of the ends of the main beam (10) and which are connected by thin membranes (15, 15') to the non-deformable parts (2, 3).

11. A sensor according to claim 10, characterized in that the cavities (4,4') communicate together by a passage (26) extending through the main beam (10), one of the cavities (4, 4') being open on at least one lateral face of the proof body; and in that the two cavities (4, 4') are closed hermetically by a cover.

12. A sensor according to claim 2, characterized in that the measuring beam (12) is connected laterally to the second non-deformable part (3) of the proof body by two thin membranes (15), which makes possible a deformation of the measuring beam (12) relative to the proof body (1).

* * * * *